US012562901B2

(12) United States Patent
Jog et al.

(10) Patent No.: US 12,562,901 B2
(45) Date of Patent: Feb. 24, 2026

(54) EXTERNAL KEY MANAGER ERROR HANDLING FOR ENCRYPTED PLATFORM-HOSTED DATA

(71) Applicant: Google LLC, Mountain View, CA (US)

(72) Inventors: Rohit Vijay Jog, Milpitas, CA (US); Cristina Schmidt, Mountain View, CA (US)

(73) Assignee: Google LLC, Mountain View, CA (US)

( * ) Notice: Subject to any disclaimer, the term of this patent is extended or adjusted under 35 U.S.C. 154(b) by 139 days.

(21) Appl. No.: 18/538,121

(22) Filed: Dec. 13, 2023

(65) Prior Publication Data

US 2024/0205004 A1 Jun. 20, 2024

Related U.S. Application Data

(60) Provisional application No. 63/432,543, filed on Dec. 14, 2022.

(51) Int. Cl.
| | |
|---|---|
| *H04L 9/08* | (2006.01) |
| *G06F 11/14* | (2006.01) |
| *G06F 16/2457* | (2019.01) |

(52) U.S. Cl.
CPC ........ *H04L 9/0894* (2013.01); *G06F 11/1443* (2013.01); *G06F 16/24573* (2019.01); *H04L 9/0822* (2013.01)

(58) Field of Classification Search
USPC ........................................................ 713/189
See application file for complete search history.

(56) References Cited

U.S. PATENT DOCUMENTS

| | | | | |
|---|---|---|---|---|
| 2019/0173675 A1* | 6/2019 | Kaufman | .............. | H04L 9/0894 |
| 2022/0329413 A1* | 10/2022 | Schindewolf | ......... | G06F 21/602 |
| 2023/0393946 A1* | 12/2023 | Barui | ................... | H04L 9/0894 |

OTHER PUBLICATIONS

International Search Report and Written Opinion for PCT Application No. PCT/US2023/083745, dated Mar. 20, 2024. 11 pages.
International Preliminary Report on Patentability for International Application No. PCT/US2023/083745 dated Jun. 26, 2025. 6 pages.

* cited by examiner

*Primary Examiner* — Younes Naji
(74) *Attorney, Agent, or Firm* — Lerner David LLP

(57) ABSTRACT

Aspects of the disclosure relate to a system for responding to transient errors temporarily preventing a computing platform hosting data from communicating with an external key manager hosting keys used to encrypt the platform data. The encryption key can be controlled external to the system in an external key manager (EKM). If an error occurs in which the system and the EKM are temporarily not in communication, the external key controlled by the EKM is temporarily not available. The system begins an observation period, during which the observation period the system polls the EKM to check if the external key continues to be unavailable. The system unloads the encrypted data if, after the expiration of the observation period, the EKM is still not available. If the EKM and the external key becomes accessible again during the observation period, the system cancels the observation period and resumes normal operation.

17 Claims, 5 Drawing Sheets

EXTERNAL KEY MANAGER ERROR HANDLING FOR ENCRYPTED PLATFORM-HOSTED DATA

CROSS-REFERENCE TO RELATED APPLICATIONS

The present application claims priority to U.S. Provisional Application No. 63/432,543, filed Dec. 14, 2022, the disclosure of which is hereby incorporated by reference herein.

BACKGROUND

A database management system (DBMS) is a system for managing databases and for receiving and resolving queries to the managed databases. A DBMS can manage datasets on devices storing the databases. A dataset is a container for database objects, such as tables, views, functions, stored procedures, etc. The DBMS can read and write to database objects. Reading and writing operations include updating, deleting, and adding data to the database objects.

A DBMS may be part of a computing platform configured for managing databases accessed by user devices from a variety of different physical locations. The computing platform encrypts stored data and manages cryptographic keys for the encrypted data using a key management service (KMS). A KMS can generate, use, rotate, or delete keys according to a variety of different cryptographic protocols and on behalf of a user of the platform. Some users, however, may use external key managers (EKMs), which perform the functions of a KMS but for the users' keys. An EKM is implemented on devices different from those on which the computing platform is implemented. Keys external to the platform are managed by an EKM.

To provide encrypted data in response to a user request, the platform communicates with the EKM to decrypt a second key used to encrypt the data. The second key, or key encryption key, is encrypted using a key external to the platform.

EKMs are also prone to transient errors, e.g., network interruptions, hardware failures, etc., which may be resolved within a brief period of time. If a request to the EKM to access an external key fails, the platform will unload the hosted data. Unloading the data occurs whether the access to the external key was deliberate, e.g., because the key was revoked, or accidental, e.g., because of a transient error in communication that resolved itself after a few minutes.

BRIEF SUMMARY

Aspects of the disclosure relate to a system for responding to transient errors temporarily preventing a computing platform hosting data from communicating with an external key manager. The encryption key can be controlled external to the DBMS in an external key manager (EKM). If an error occurs in which the DBMS and the EKM are temporarily not able to communicate, the external key controlled by the EKM is temporarily not available to be used for decrypting or encrypting keys used by the DBMS. The DBMS begins an observation period, in which during the observation period the DBMS polls the EKM to check to see if the external key continues to be unavailable. The DBMS unloads the encrypted data if, after the expiration of the observation period, the EKM is still not available. If the EKM and the external key becomes accessible again during the observation period, the DBMS cancels the observation period and continues normal reading/writing of the encrypted data.

An aspect of the disclosure provides for a method including: maintaining, by one or more processors, a database encrypted using an external key managed by an external key manager; receiving, by one or more processors of a database management system, an indication that the external key is unavailable; initiating, by the one or more processors, an observation period for a predetermined period of time; during the observation period, polling, by the one or more processors, the external key manager to determine whether the external key is available; determining, by the one or more processors, that the external key was not available during the observation period, and in response, unloading the database after the end of the observation period.

Other implementations of this aspect include corresponding computer systems, apparatus, and computer programs recorded one or more computer-readable storage media, each configured to perform the actions of the methods.

The foregoing and other implementations can each optionally include one or more of the following features, alone or in combination. One implementation includes all the following features in combination.

Maintaining the database includes: restarting, by the one or more processors, the database management system during the observation period; saving, by the one or more processors, the remaining time of the observation period at the time of restarting the database and the status of the key as of the last poll during the observation period and prior to restarting the database management system; and resuming, by the one or more processors, the observation period and the polling from the remaining time after the database management system is restarted.

Saving the remaining time and the status of the key as metadata associated with the database.

The database management system includes a partition manager. The database includes a plurality of partitions, and wherein restarting the database management system includes restarting the partition manager.

The external key is deleted or refreshed by the external key manager without the external key manager sending a status or indication to the one or more processors that the external key has been deleted or refreshed.

The unavailability of the external key is due to a communication error between the database management system and the external key manager.

The method further includes determining, by the one or more processors and during the observation period, that the external key is available again; and in response to the determination that the change in status did occur, canceling, by the one or more processors, the observation period.

The polling includes sending, by the one or more processors, a plurality of requests during the observation period, wherein each request is a request for a response as to whether the external key is available at the time the request was sent.

The database is encrypted using a key encryption key and the key encryption key is encrypted using the external key.

Another aspect of the disclosure provides a system comprising one or more processors configured to perform the method described above.

Yet another aspect of the disclosure provides a non-transitory computer-readable medium storing instructions executable by one or more processors for performing the method described above.

OVERVIEW

Figure 1:
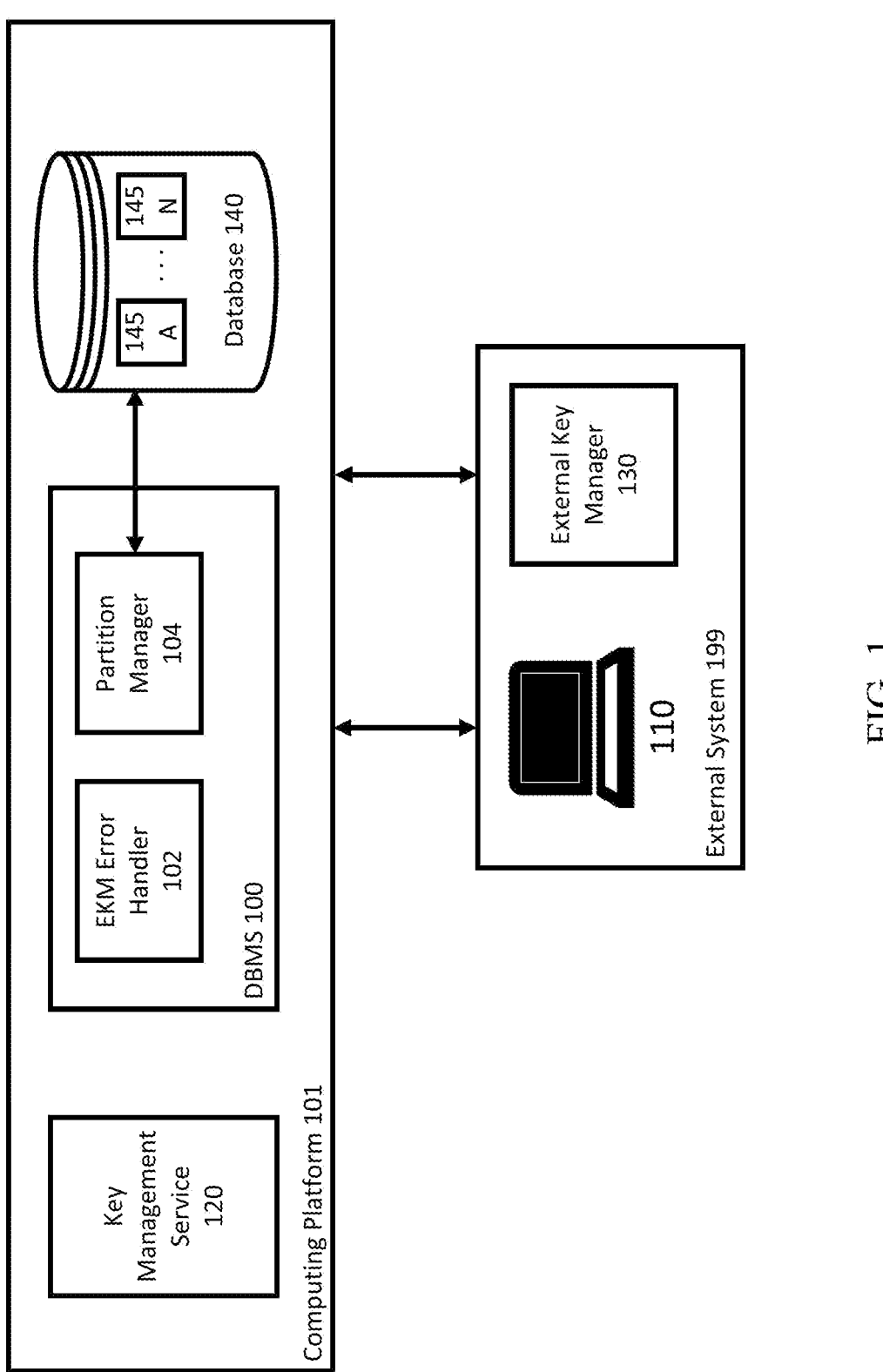
FIG. 1 is a block diagram of an example database management system implementing key external manager error handling, according to aspects of the disclosure.

Aspects of the disclosure relate to a system for handling errors in communication with an external key manager for avoiding the premature unloading of encrypted data. A database management system (DBMS) can manage databases on a computing platform or other system. The managed databases can be encrypted using a key encryption key (KEK), which itself may be encrypted by an encryption key controlled by a user system for which the database is hosted on the platform. The encryption key can be controlled external to the DBMS in an external key manager (EKM). If an error occurs in which the DBMS and the EKM are temporarily not in communication, the external key controlled by the EKM cannot be used to encrypt or decrypt KEKs. Aspects of the disclosure provide for the DBMS to begin an observation period, in which, during the observation period, the DBMS polls the EKM to check to see if the external key continues to be unavailable. The DBMS unloads the encrypted data if, after the expiration of the observation period, the EKM is still not available. If the EKM and the external key becomes accessible again during the observation period, the DBMS cancels the observation period and continues normal reading/writing of the encrypted data.

By enabling the observation period and polling the EKM, the DBMS as described herein manages transient errors in communication with the EKM more efficiently than traditional approaches in which the DBMS immediately unloads data upon error detection. By the nature of an EKM being hosted external to a platform, the DBMS may not always have up-to-date information indicating the reason an external key is not available. In some examples, the external key may only be temporarily unavailable, e.g., because of a transient error such as a power outage at the site where the EKM is hosted. Other sources of transient error can include network issues, device/system restarts or crashes, or scheduled down time for the EKM that is not reported to the DBMS.

In these and other cases, the source of error is temporary, and may resolve in minutes. To avoid unnecessarily reacting to transient error by prematurely unloading data encrypted by the external key, the DBMS starts an observation period in which the EKM is polled periodically. The polling can occur even outside of the observation period, e.g., continuously or periodically through the normal operation of the DBMS. In some examples, the frequency of the polling can be adjusted during an observation period.

The length of the observation period and the time between polls may be predetermined, e.g., one hour and five-minute intervals, respectively. The specific time set for the observation period can be a manual or automatically set trade-off between allowing enough time for transient errors to resolve and unloading databases promptly if the keys encrypting those databases are no longer available. Delaying an immediate unload of the encrypted data can prevent wasted computational resources, e.g., measured in processing cycles and memory bandwidth, if the error ends up being transient and can be resolved within the observation period. Data is unloaded in response to a permanent change in the state of the external key, such as a revocation of the key by the EKM.

The DBMS as described herein can persist the observation period even when the DBMS itself is restarted or temporarily taken offline. The DBMS can store, e.g., as metadata corresponding to a database, the remaining time of an observation period and the state that was retrieved from the last pool sent to the EKM. Then, after a restart, the DBMS can resume the observation period from the stored remaining time. As the DBMS may need to be restarted or periodically taken offline, storing the remaining time of the observation period ensures that a set amount of time is given to determine whether an error preventing communication with the EKM is transient or not.

The DBMS can react to information in real-time to take appropriate action if, for example, the cause of an error in communication is determined not to be transient. For example, the EKM may send an indication to the DBMS that an external key was revoked, but not do so until some time after the revocation occurred. The DBMS, in the time between key revocation and the indication of key revocation by the EKM, may initiate an observation period to poll the EKM and determine whether the encrypted database should be unloaded. Upon receiving the indication of the key revocation, the DBMS can automatically perform operations for unloading the encrypted database, instead of completing the observation period.

Reading and writing of data can occur even during the observation period. During the observation period, there can be instances in which reading or writing from a database or particular tablet is not possible due to restarts of the device or devices hosting the DBMS. In some examples, only a portion or partition of a database may have an unavailable key, while other portions of the database are accessible. The DBMS can initiate an observation period only for unavailable external keys.

Aspects of the disclosure provide for at least the following technical advantages. Delaying data unloading until after an observation period mitigates the chance that a transient error causes a DBMS from incorrectly unloading data. Unnecessary downtime is mitigated by avoiding data unloading, which in turn preserves the uptime of services and applications relying on the encrypted data for performing their respective functions. Aspects of the disclosure can overcome shortcomings of system design in which external key managers are used. Because external key managers are external to a platform or system that may rely on those managers, aspects of the disclosure compensate for the fact that the status of external key managers may be at times opaque and unreliable. Providing an observation period for appropriately reacting to potential transient errors can solve or mitigate issues in premature database unloading, in a manner that can be applied to a central platform or location, rather than requiring each external key manager to modify their respective implementation for external key management.

Example Systems

FIG. 1 is a block diagram of an example database management system (DBMS) 100 implementing key external manager error handling, according to aspects of the disclosure. The DBMS 100 can be hosted on a computing platform 101, which, as described herein with reference to FIG. 5, can be a collection of devices configured for providing a service or collection of services over a network. A device or system can be in communication with the platform 101 over a network, such as a local network or over an internet connection.

External system 199, for example, can include a user device 110 and an external key manager 130, and other devices from example-to-example. User device 110 may access data hosted by the platform 101 from database 140. Database 140 may be partitioned, e.g., through partitions 145A-N, although in some examples database 140 can be subdivided in other ways, including not being subdivided at all. When the database 140 is partitioned, a partition manager 104 can manage each partition and can be configured to create, modify, or destroy partitions based on input. External system 199 can also include an external key manager (EKM) 130. EKM 130 manages external keys unique to the external system 199. The platform 101 does not have control or direct access to the external keys in the EKM 130, but requests the use of the external keys from key management service (KMS) 120.

KMS 120 is configured to manage keys used to encrypt data in the database 140. Keys used and managed by the KMS 120 may themselves be encrypted as key encryption keys (KEKs). The keys may be encrypted using the external keys stored by the external key manager 130. As a result, when the DBMS 101 retrieves data from the database 140, the KEKs are decrypted by the EKM 130, if the EKM 130 is available. As described herein, when the EKM 130 is not available, the DBMS 100 can determine whether the unavailability is due to a key revocation, or other permanent change in the status of the key. For example, the EKM 130 may revoke a key explicitly, but not immediately send an indication of this status change to DBMS 100.

Figure 3:
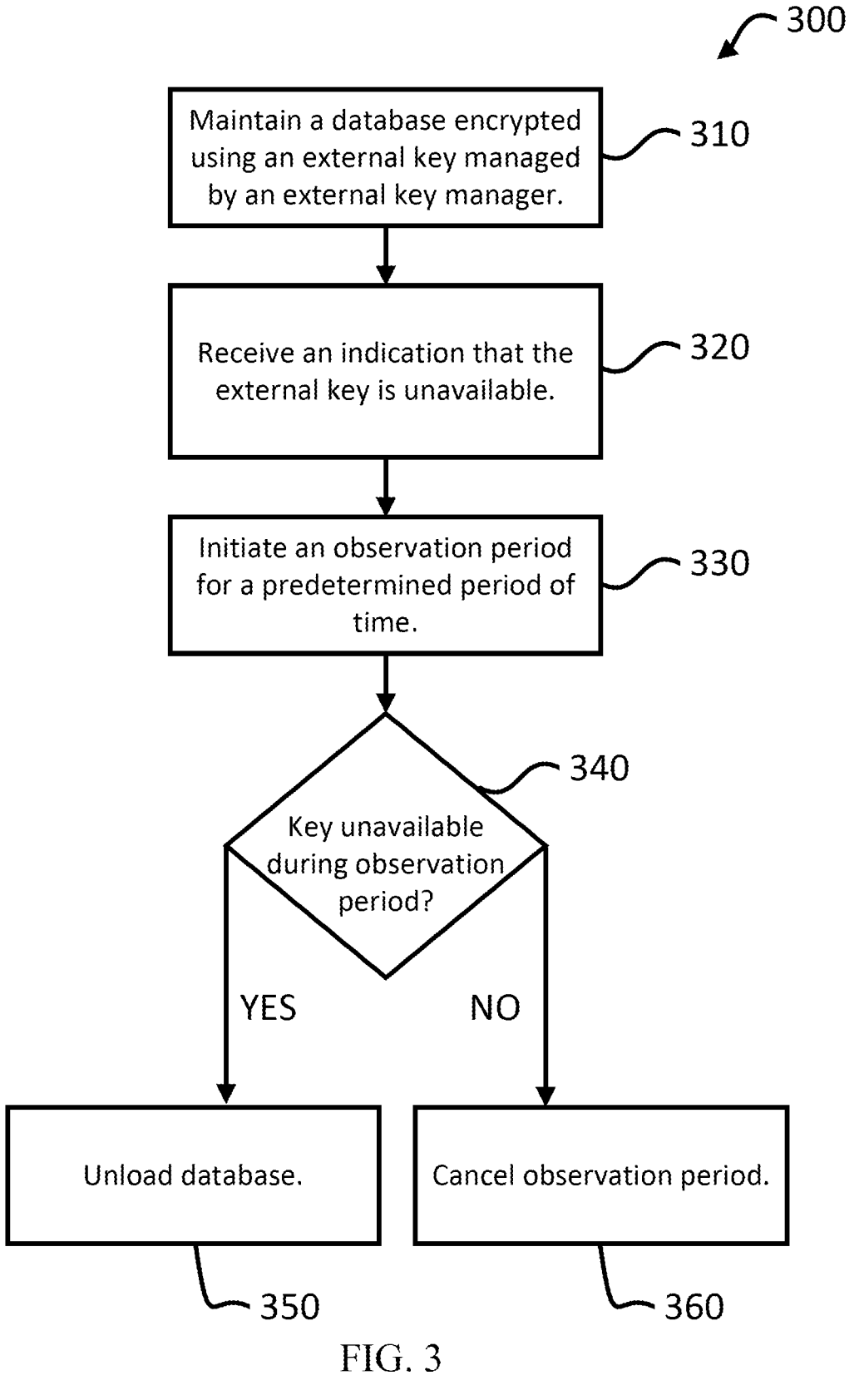
FIG. 3 is a flow diagram of an example process for external key manager error handling, according to aspects of the disclosure.
Figure 4:
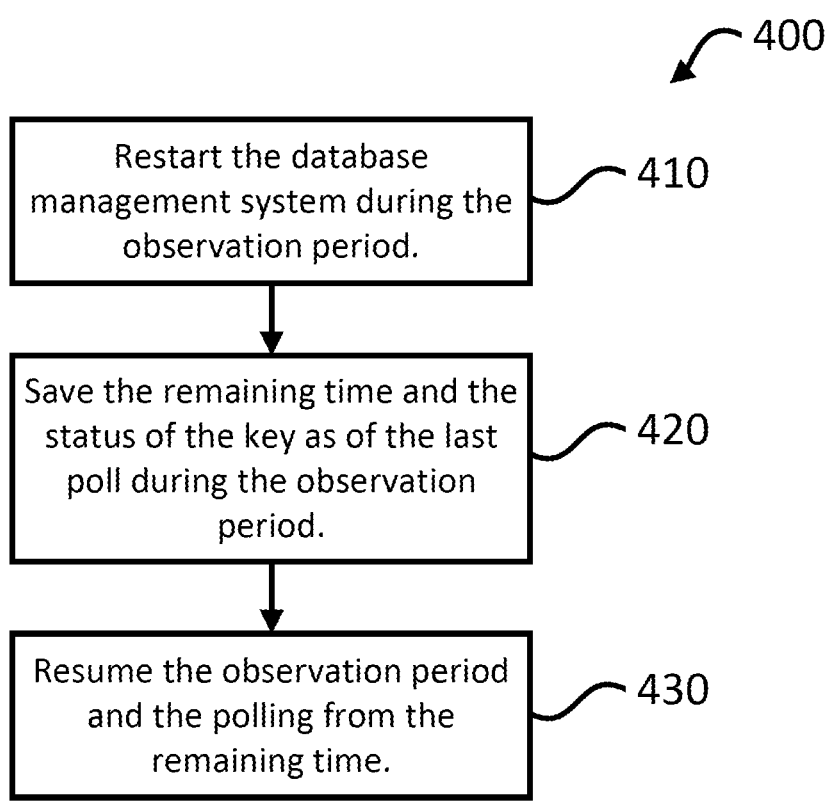
FIG. 4 is a flow diagram of an example process for causing the observation to persist between database management system restarts, according to aspects of the disclosure.

As described herein with reference to FIGS. 3 and 4, EKM error handler 102 can initiate an observation period to poll the EKM 130 for the status of an external key. If the observation period expires and the external key is still unavailable, then the EKM error handler 102 is configured to unload the database 140. Unloading the database 140 causes the data to be inaccessible and may eventually be deleted or otherwise removed from external access. In some examples, the platform 101 may reserve a portion of storage space for the external system 199, which may include the database 140.

Example Methods

Figure 2:
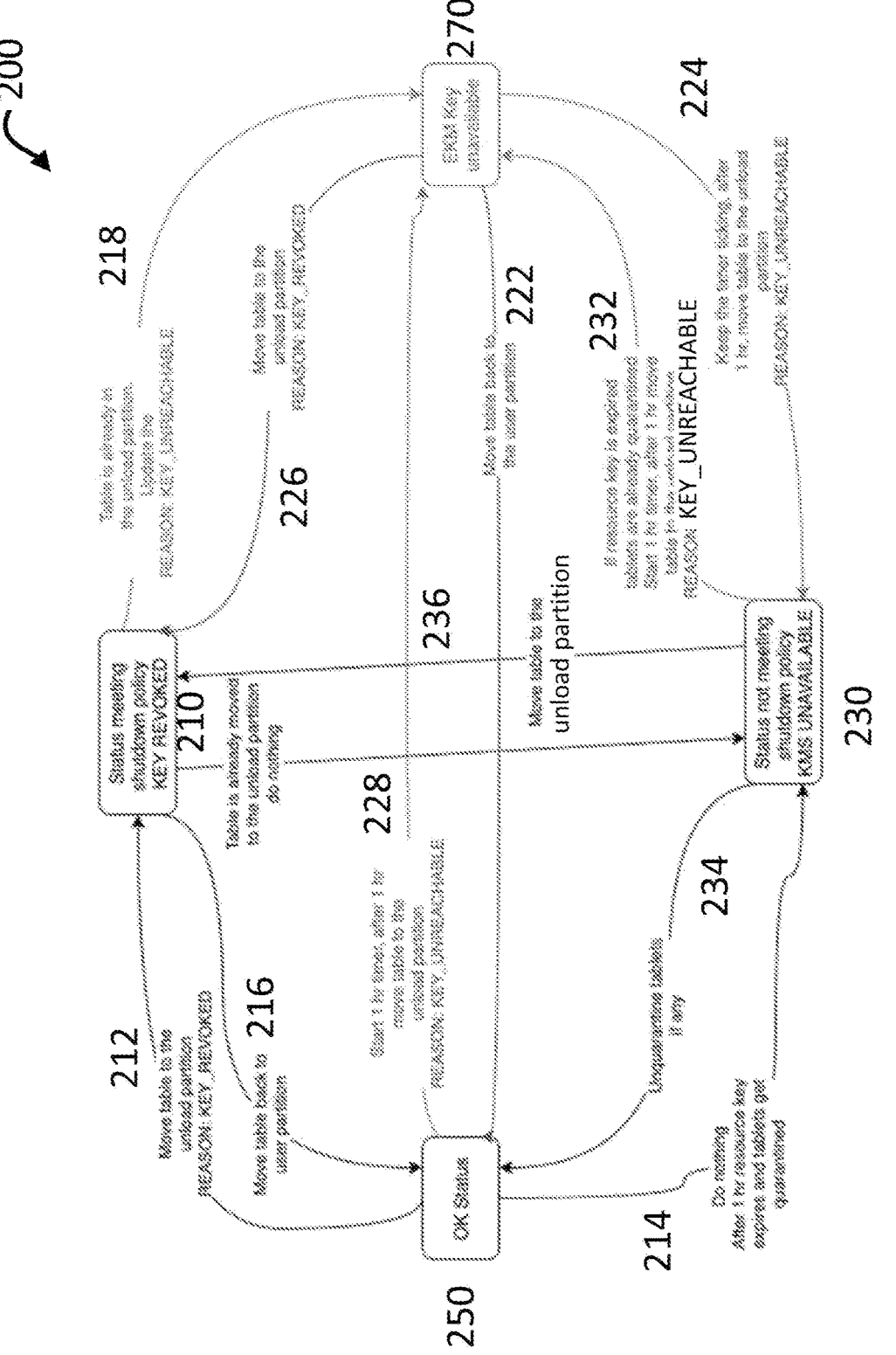
FIG. 2 is a state diagram of example state transitions of the example DBMS, including a state for key unavailability.

FIG. 2 is a state diagram 200 of example state transitions of the example DBMS, including a state for key unavailability. The state diagram 200 illustrates four states 210, 230, 250, and 270, for the DBMS 100. In other examples, the DBMS 100 can be in fewer or more states, including states not shown in the state transition diagram 200. Each state can transition to one of the three other states, through state transitions indicated by solid arrows. State 250 is the "OK State," in which the DBMS 100 is operating and communicating with an external key manager without error. The DBMS 100 can be in different states depending on the external key or external key manager in communication with the DBMS 100. The target data refers to the data encrypted by the KEK that itself is encrypted by the external key. In some examples, the target data may be encrypted by the external key, or by another means using the external key not described here.

From the state 250 ("OK"), the DBMS 100 can operate according to transition 212 to unload a database or partition of a database. The reason for the transition 212 may be because the external key used to encrypt the KEK for the target database has been revoked. Transition 212 causes the DBMS 100 to enter state 210. State 210 is the "KEY REVOKED State," in which the DBMS 100 has the database or partitions of the database unloaded to prevent further access.

From the state 250 ("OK"), the DBMS 100 can operate according to transition 214 to cease further action after the expiration of the KEK. As part of transition 214, the database or partitions of the database are quarantined to prevent further access to its data. Quarantined data is unloaded for the purpose of resolving the issue prompting the quarantine. When the issue is fixed or resolved, the DBMS can then reload the quarantined data. This in contrast to when data is no longer available as a result of, for example, user input such as the revocation of the key used to encrypt the data. In those examples, the DBMS can unload the data without quarantining the data first. Transition 214 causes the DBMS 100 to enter 230. State 230 is the "KMS UNAVAILABLE State," in which the DBMS 100 does not meet the condition for unloading the database or partitions of the database.

From the state 250 ("OK"), the DBMS 100 can operate according to transition 228 to start the observation period for unloading the target data. Transition 228 causes the DBMS 100 to enter state 270. State 270 is the "KEY UNAVAILABLE State," from which the DBMS 100 determines whether to unload a target database or database partition. As described herein, because a communication or other type of error may occur causing a temporary communication loss between the DBMS 100 and an external key manager, the EKM error handler for the DBMS 100 can initiate an observation period to poll the external key manager. If the key remains unavailable through the observation period, the target data is unloaded.

From the state 210 ("KEY REVOKED"), the DBMS 100 can operate according to transition 216 to move data back to the partition corresponding to a user. Transition 216 causes the DBMS 100 to enter state 250 ("OK") and might occur, for example, because the external key for the target data was refreshed. From the state 210, the DBMS 100 can operate according to transition 218 to update the current error to indicate that the external key manager is unavailable. Transition 218 causes the DBMS 100 to enter state 270. State 270 is the "KEY UNAVAILABLE State," from which the DBMS 100 determines whether to unload a target database or database partition.

From the state 270 ("KEY UNAVAILABLE"), the DBMS 100 can operate according to transition 222 to move the target data back to the user partition. Transition 222 causes the DBMS 100 to enter the state 250 ("OK"). Transition 222 may occur, for example, because the DBMS received an indication that the error in communication between the DBMS 100 and the external key manager has been resolved.

From the state 270 ("KEY UNAVAILABLE"), the DBMS 100 can operate according to transition 224 to move to state 230 ("KEY UNAVAILABLE") if the external key encrypting the KEK for the target data is still not available after the observation period. From the state 270, the DBMS 100 can also operate according to transition 226 to move to state 210 ("KEY REVOKED") if the external manager revokes the external key. If the DBMS 100 is currently in an observation period when the external key is revoked, the DBMS 100 moves to state 210 to unload the target data, instead of completing the observation period.

From state 230 ("KMS UNAVAILABLE"), the DBMS 100 can operate according to transition 232 to start the observation period for unloading the target data. Transition 232 may occur if the external key is expired, and the target data or partitions of the target data are already quarantined. Transition 232 causes the DBMS 100 to enter state 270 ("KEY UNAVAILABLE"). As described with reference to the transition 224, if after the observation period the external key is still not available, the DBMS 100 will move back to state 230 and to state 210 ("KEY REVOKED") to unload the target data.

From state 230 ("KMS UNAVAILABLE"), the DBMS 100 can operate according to transition 234 to un-quarantine target data and return to state 250 ("OK"). Transition 234 may occur if the external key is made available again, or a new key is generated. From the state 230, the DBMS 100 can operate according to transition 236 to move the target data to the unload partition. Transition 236 may occur, for example, because a key is unavailable even after the termination of the observation period.

FIG. 3 is a flow diagram of an example process 300 for external key manager error handling, according to aspects of the disclosure. The example processes 300 and 400 described herein may be performed by a device or system including one or more processors. In some examples, processes described in this specification, including processes 300 and 400, may be performed by the database management system 100 described herein with reference to FIG. 1. Although some steps of the processes 300 and 400 are described as being performed in a particular order, in some examples different steps may be added, removed, modified and/or be performed in parallel or sequentially. Further, although reference is made to a single publisher system and a single subscriber system, it is understood that the processes 300 and 400 can be repeated multiple times for multiple keys managed by different external key managers in communication with the database management system.

The system maintains a database encrypted using an external key managed by an external key manager, according to block 310. As described herein with reference to FIG. 1, the system can maintain a database encrypted using a key encryption key ("KEK"), which may be cached or otherwise stored in the system and encrypted using an external key managed by an external key manager.

The system maintains a database encrypted using an external key managed by an external key manager, according to block 310.

The system receives an indication that the external key is unavailable, according to block 320. The indication can be, for example, a time-out or network error code indicating that the external key managed is unreachable. As another example, the external key may be deleted or refreshed by the external key manager, without the external key manager sending a status or indication to the one or more processors that the external key has been deleted or refreshed.

The system initiates an observation period for a predetermined period of time, according to block 330. The observation period can vary from example-to-example. For example, the observation period can be one hour, thirty minutes, fifteen minutes, etc.

The system determines whether the key is unavailable during the observation period, according to decision block 340. The key is unavailable during the observation period, if, for each poll during the observation period, the result of the poll was an indication of the key's continued unavailability. A poll can be a request over a network asking for the status of the key. The key may be available, unavailable, revoked, etc. The time between polls can vary from example-to-example. For example, the period between polls can be five minutes.

If the system determines that the key was unavailable during the observation period ("YES"), the system unloads the database, according to block 350. If the system determines that the key was available during the observation period ("NO"), then the system cancels the observation period, according to block 360. Canceling the observation period can mean ending the observation period early.

FIG. 4 is a flow diagram of an example process 400 for causing the observation to persist between database management system restarts, according to aspects of the disclosure. As described herein, the DBMS may be restarted or temporarily shut down while an observation period is ongoing for determining whether to unload a database.

The system restarts during the observation period, according to block 410. In some examples, the restart can be scheduled, while in other examples, the restart may be unexpected, e.g., due to a system crash or other failure. In some examples, only a portion of the system is restarted, e.g., a partition manager for partitions of the database.

The system saves the remaining time and the status of the external key from the last received poll during the observation period, according to block 420. The system may perform the saving after each poll, before a restart, or both, as examples. The system may perform the saving after each poll to manage cases in which a restart is possible but unpredictable, e.g., due to a system crash. As described herein, the remaining time and the status of the key from the last poll may be saved as metadata corresponding to the encrypted database. The metadata may be cached or stored in a location that would be unaffected by a system crash, for safekeeping.

The system resumes the observation period and the polling from the remaining time, according to block 430. The system recovers from the restart/crash to resume the observation period, rather than restart or cancel the observation period altogether.

Example Computing Environment

Figure 5:
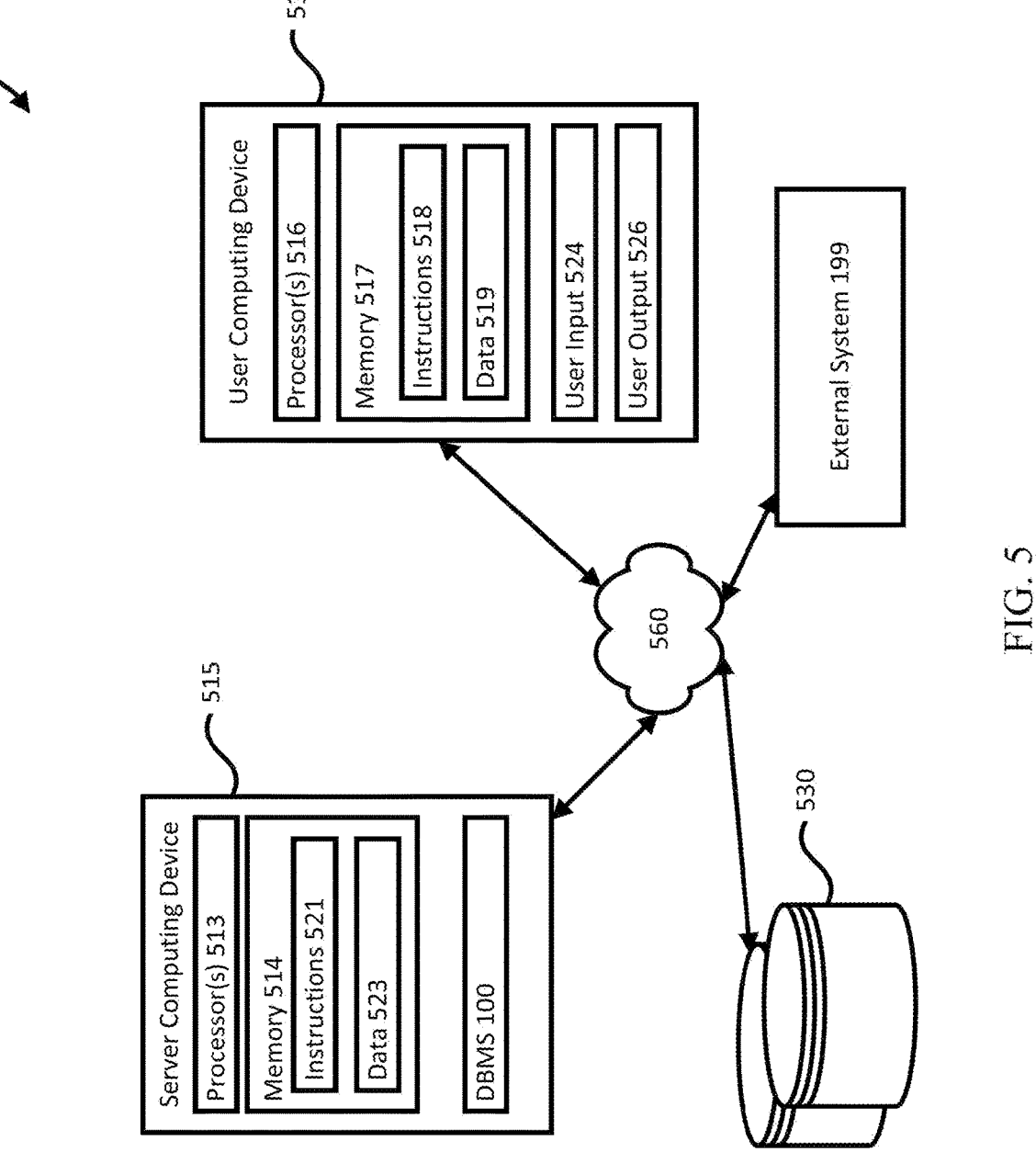
FIG. 5 is a block diagram of an example computing environment implementing the DBMS, according to aspects of the disclosure.

FIG. 5 is a block diagram of an example computing environment implementing the DBMS 100, according to aspects of the disclosure. The DBMS 100 can be implemented on one or more devices having one or more processors in one or more locations, such as in server computing device 515. User computing device 512 and the server computing device 515 can be communicatively coupled to one or more storage devices 530 over a network 560. The storage device(s) 530 can be a combination of volatile and non-volatile memory and can be at the same or different physical positions than the computing devices 512, 515. For example, the storage device(s) 530 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 515 can include one or more processors 513 and memory 514. The memory 514 can store information accessible by the processor(s) 513, including instructions 521 that can be executed by the processor(s) 513. The memory 514 can also include data 523 that can be retrieved, manipulated, or stored by the processor(s) 513. The memory 514 can be a type of non-transitory computer readable medium capable of storing information accessible by the processor(s) 513, such as volatile and non-volatile memory. The processor(s) 513 can include one or more central processing units (CPUs), graphic processing units (GPUs), field-programmable gate arrays (FPGAs), and/or application-specific integrated circuits (ASICs), such as tensor processing units (TPUs).

The instructions 521 can include one or more instructions that when executed by the processor(s) 513, causes the one or more processors to perform actions defined by the instructions. The instructions 521 can be stored in object code format for direct processing by the processor(s) 513, or in other formats including interpretable scripts or collections of independent source code modules that are interpreted on demand or compiled in advance. The instructions 521 can include instructions for implementing the DBMS 100 consistent with aspects of this disclosure. The DBMS 100 can be executed using the processor(s) 513, and/or using other processors remotely located from the server computing device 515.

The data 523 can be retrieved, stored, or modified by the processor(s) 513 in accordance with the instructions 521. The data 523 can be stored in computer registers, in a relational or non-relational database as a table having a plurality of different fields and records, or as JSON, YAML, proto, or XML documents. The data 523 can also be formatted in a computer-readable format such as, but not limited to, binary values, ASCII, or Unicode. Moreover, the data 523 can include information sufficient to identify relevant information, such as numbers, descriptive text, proprietary codes, pointers, references to data stored in other memories, including other network locations, or information that is used by a function to calculate relevant data.

The user computing device 512 can also be configured like the server computing device 515, with one or more processors 516, memory 517, instructions 518, and data 519. The user computing device 512 can also include a user output 526, and a user input 524. The user input 524 can include any appropriate mechanism or technique for receiving input from a user, such as keyboard, mouse, mechanical actuators, soft actuators, touchscreens, microphones, and sensors. The user computing device 512 can be part of or implement the user device 110, which may include one or more other devices. External system 199 can also include a number of components coupled to the server computing device 515 over the network 560, including processors, memory, instructions The server computing device 515 can be configured to transmit data to the user computing device 512, and the user computing device 512 can be configured to display at least a portion of the received data on a display implemented as part of the user output 526. The user output 526 can also be used for displaying an interface between the user computing device 512 and the server computing device 515. The user output 526 can alternatively or additionally include one or more speakers, transducers or other audio outputs, a haptic interface or other tactile feedback that provides non-visual and non-audible information to the user of the user computing device 512.

Although FIG. 5 illustrates the processors 513, 516 and the memories 514, 517 as being within the computing devices 515, 512, components described in this specification, including the processors 513, 516 and the memories 514, 517 can include multiple processors and memories that can operate in different physical positions and not within the same computing device. For example, some of the instructions 521, 518 and the data 523, 519 can be stored on a removable SD card and others within a read-only computer chip. Some or all the instructions and data can be stored in a position physically remote from, yet still accessible by, the processors 513, 516. Similarly, the processors 513, 516 can include a collection of processors that can perform concurrent and/or sequential operation. The computing devices 515, 512 can each include one or more internal clocks providing timing information, which can be used for time measurement for operations and programs run by the computing devices 515, 512.

The server computing device 515 can be configured to receive requests to process data from the user computing device 512. For example, the environment 500 can be part of a computing platform configured to provide a variety of services to users, through various user interfaces and/or APIs exposing the platform services.

The devices 512, 515 can be capable of direct and indirect communication over the network 560. The devices 515, 512 can set up listening sockets that may accept an initiating connection for sending and receiving information. The network 560 itself can include various configurations and protocols including the Internet, World Wide Web, intranets, virtual private networks, wide area networks, local networks, and private networks using communication protocols proprietary to one or more companies. The network 560 can support a variety of short- and long-range connections. The short- and long-range connections may be made over different bandwidths, such as 2.402 GHz to 2.480 GHZ (commonly associated with the Bluetooth® standard), 2.4 GHz and 5 GHz (commonly associated with the Wi-Fi® communication protocol); or with a variety of communication standards, such as the LTE® standard for wireless broadband communication. The network 560, in addition or alternatively, can also support wired connections between the devices 512, 515, including over several types of Ethernet connection.

Although a single server computing device 515 and user computing device 512, are shown in FIG. 5, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including," and the like, should not be interpreted as limiting the subject matter of the claims to the specific examples; rather, the examples are intended to illustrate only one of many possible implementations. Further, the same reference numbers in different drawings can identify the same or similar elements.

With respect to the use of substantially any plural and/or singular terms herein, for example (with the term "element" being a stand-in for any system, component, data, etc.) "an/the element," "one or more elements," "multiple elements," a "plurality of elements," "at least one element," etc., those having skill in the art can translate from the plural to the singular and/or from the singular to the plural as is appropriate to the context and/or application described. The various singular/plural permutations may be expressly set forth herein, for sake of clarity and without limitation unless expressly indicated.

The invention claimed is:

1. A method comprising:
maintaining, by one or more processors, a database encrypted using an external key managed by an external key manager;
receiving, by one or more processors of a database management system, an indication that the external key is unavailable;
initiating, by the one or more processors, an observation period for a predetermined period of time;
during the observation period, polling, by the one or more processors, the external key manager to determine whether the external key is available; and
determining, by the one or more processors, that the external key was not available during the observation period, and in response, unloading the database after the end of the observation period, wherein maintaining the database comprises:
restarting, by the one or more processors, the database management system during the observation period;
saving, by the one or more processors, remaining time of the observation period at a time of restarting the database and a status of the external key as of a last poll during the observation period and prior to restarting the database management system; and resuming, by the one or more processors, the observation period and the polling from the remaining time after the database management system is restarted.

2. The method of claim 1, further comprising saving the remaining time and the status of the external key as metadata associated with the database.

3. The method of claim 1,
wherein the database management system comprises a partition manager and wherein the database comprises a plurality of partitions, and wherein restarting the database management system comprises restarting the partition manager.

4. The method of claim 1, wherein the external key is deleted or refreshed by the external key manager without the external key manager sending a status or indication to the one or more processors that the external key has been deleted or refreshed.

5. The method of claim 1, wherein the unavailability of the external key is due to a communication error between the database management system and the external key manager.

6. The method of claim 5, wherein the method further comprises:
determining, by the one or more processors and during the observation period, that the external key is available again; and
in response to the determination that the external key is available again, canceling, by the one or more processors, the observation period.

7. The method of claim 6, wherein the polling comprises:
sending, by the one or more processors, a plurality of requests during the observation period, wherein each request is a request for a response as to whether the external key is available at the time the request was sent.

8. The method of claim 1, wherein the database is encrypted using a key encryption key and the key encryption key is encrypted using the external key.

9. A database management system comprising one or more processors, the one or more processors configured to:
maintain, a database encrypted using an external key managed by an external key manager;
receive, an indication that the external key is unavailable;
initiate, an observation period for a predetermined period of time;
during the observation period, poll the external key manager to determine whether the external key is available; and
determine that the external key was not available during the observation period, and in response, unload the database after the end of the observation period, wherein in maintaining the database, the one or more processors are configured to:
restart the database management system during the observation period;
save remaining time of the observation period at a time of restarting the database and a status of the external key as of a last poll during the observation period and prior to restarting the database management system; and
resume the observation period and the polling from the remaining time after the database management system is restarted.

10. The system of claim 9, wherein the one or more processors are further configured to save the remaining time and the status of the external key as metadata associated with the database.

11. The system of claim 9, wherein the database management system comprises a partition manager and wherein the database comprises a plurality of partitions, and wherein in restarting the database management system, the one or more processors are configured to restart the partition manager.

12. The system of claim 9, wherein the external key is deleted or refreshed by the external key manager without the external key manager sending a status or indication to the one or more processors that the external key has been deleted or refreshed.

13. The system of claim 9, wherein the unavailability of the external key is due to a communication error between the database management system and the external key manager.

14. The system of claim 13, wherein the one or more processors are further configured to:

determine that the external key is available again; and in response to the determination that the external key is available again, cancel the observation period.

15. The system of claim 14, wherein in polling the external key manager, the one or more processors are configured to:

send a plurality of requests during the observation period, wherein each request is a request for a response as to whether the external key is available at the time the request was sent.

16. The system of claim 9, wherein the database is encrypted using an key encryption key and the key encryption key is encrypted using the external key.

17. One or more non-transitory computer-readable storage media storing instructions that when executed by one or more processors, causes the one or more processors to perform operations comprising:

maintaining a database encrypted using an external key managed by an external key manager;

receiving an indication that the external key is unavailable;

initiating an observation period for a predetermined period of time;

during the observation period, polling the external key manager to determine whether the external key is available; and determining that the external key was not available during the observation period, and in response, unloading the database after the end of the observation period, wherein maintaining the database comprises:

restarting a database management system comprising the one or more processors during the observation period;

saving remaining time of the observation period at a time of restarting the database and a status of the external key as of a last poll during the observation period and prior to restarting the database management system; and resuming the observation period and the polling from the remaining time after the database management system is restarted.

\* \* \* \* \*